US009499038B2

(12) United States Patent
Tang et al.

(10) Patent No.: US 9,499,038 B2
(45) Date of Patent: Nov. 22, 2016

(54) INTEGRATED HYBRID POWER ASSEMBLY AND VEHICLE COMPRISING THE SAME

(71) Applicants: BYD COMPANY LIMITED, Shenzhen (CN); SHENZHEN BYD AUTO R&D COMPANY LIMITED, Shenzhen (CN)

(72) Inventors: Guo Tang, Shenzhen (CN); Yu Hua, Shenzhen (CN); Jing Liu, Shenzhen (CN); Jinchen Lin, Shenzhen (CN)

(73) Assignees: SHENZHEN BYD AUTO R&D COMPANY LIMITED, Shenzhen, Guangdong (CN); BYD COMPANY LIMITED, Shenzhen, Guangdong (CN)

(*) Notice: Subject to any disclaimer, the term of this patent is extended or adjusted under 35 U.S.C. 154(b) by 0 days.

(21) Appl. No.: 14/828,904

(22) Filed: Aug. 18, 2015

(65) Prior Publication Data

US 2015/0352941 A1 Dec. 10, 2015

Related U.S. Application Data

(63) Continuation of application No. PCT/CN2014/074162, filed on Mar. 27, 2014.

(30) Foreign Application Priority Data

Mar. 28, 2013 (CN) .......................... 2013 1 0103370

(51) Int. Cl.
| | |
|---|---|
| *B60K 6/20* | (2007.10) |
| *B60K 6/26* | (2007.10) |
| *B60K 6/36* | (2007.10) |
| *B60K 6/387* | (2007.10) |
| *B60K 6/405* | (2007.10) |
| *F16H 57/028* | (2012.01) |

(52) U.S. Cl.
CPC . *B60K 6/26* (2013.01); *B60K 6/36* (2013.01); *B60K 6/387* (2013.01); *B60K 6/405* (2013.01);

(Continued)

(58) Field of Classification Search
CPC ........... B60K 1/02; B60K 6/20; B60K 6/22; B60K 6/40; B60K 6/405; B60K 17/356; B60K 6/26; B60K 6/36; B60K 6/387
See application file for complete search history.

(56) References Cited

U.S. PATENT DOCUMENTS

| | | | | |
|---|---|---|---|---|
| 5,934,395 A | * | 8/1999 | Koide | ...................... B60K 6/40 180/65.235 |
| 6,116,364 A | * | 9/2000 | Taguchi | ................. B60K 6/405 180/165 |

(Continued)

FOREIGN PATENT DOCUMENTS

| | | |
|---|---|---|
| CN | 2909676 Y | 6/2007 |
| CN | 102378702 A | 3/2012 |

(Continued)

OTHER PUBLICATIONS

Shenzhen BYD Auto, ISRWO, PCT/CN2014/074162, Jul. 7, 2014, 12 pgs.

*Primary Examiner* — Frank Vanaman
(74) *Attorney, Agent, or Firm* — Morgan, Lewis & Bockius LLP

(57) ABSTRACT

An integrated hybrid power assembly and a vehicle including the same. The integrated hybrid power assembly includes a transmission comprising a front housing and a rear housing, a drive motor comprising a motor housing integrated with the rear housing of the transmission and a motor cover mounted to the motor housing, a speed reducer comprising a reducer housing, which is fixedly connected to the rear housing of the transmission and integrated with the motor cover of the drive motor, and a speed reducer cover mounted to the reducer housing; and a starting motor mounted to the transmission.

17 Claims, 10 Drawing Sheets

(52) U.S. Cl.
CPC .......... *F16H 57/028* (2013.01); *Y02T 10/6247* (2013.01); *Y10S 903/906* (2013.01); *Y10S 903/909* (2013.01); *Y10S 903/914* (2013.01); *Y10S 903/951* (2013.01); *Y10S 903/952* (2013.01); *Y10T 74/13* (2015.01)

(56) References Cited

U.S. PATENT DOCUMENTS

| | | | | |
|---|---|---|---|---|
| 6,332,257 | B1* | 12/2001 | Reed, Jr. | B60K 6/26 29/401.1 |
| 2002/0060099 | A1* | 5/2002 | Takenaka | B60K 6/365 180/65.1 |
| 2002/0129980 | A1 | 9/2002 | Mizon et al. | |
| 2004/0154846 | A1* | 8/2004 | Kira | B60K 6/405 180/65.6 |
| 2008/0202829 | A1* | 8/2008 | Gelinas | B60K 6/26 180/65.235 |
| 2009/0206709 | A1* | 8/2009 | Kakuda | B60K 6/405 310/68 D |

FOREIGN PATENT DOCUMENTS

| | | |
|---|---|---|
| EP | 1253036 A1 | 10/2002 |
| JP | 2006103535 A | 4/2006 |

* cited by examiner

INTEGRATED HYBRID POWER ASSEMBLY AND VEHICLE COMPRISING THE SAME

CROSS-REFERENCE TO RELATED APPLICATION

This application is a continuation application of PCT Patent Application No. PCT/CN2014/074162, entitled "INTEGRATED HYBRID POWER ASSEMBLY AND VEHICLE COMPRISING THE SAME" filed on Mar. 27, 2014, which claims priority to Chinese Patent Application No. 201310103370.3, entitled "INTEGRATED HYBRID POWER ASSEMBLY AND VEHICLE COMPRISING THE SAME" filed Mar. 28, 2013, both of which are incorporated by reference in their entirety.

FIELD

The present disclosure relates to an integrated hybrid power assembly and a vehicle including the integrated hybrid power assembly.

BACKGROUND

The hybrid power assembly in the related art is generally consisted of an engine 1, a transmission 2 and a motor 3.

FIG. 1 shows a hybrid power assembly in the related art. The output shaft of the motor is connected to the reversing shaft of the transmission via a speed reducer 4, and the transferring of the torque is accomplished via gears and spline. A front housing of the transmission is connected to the engine 1, a motor housing of motor 3 is connected to a rear housing of the transmission via a motor bracket 5, and the speed reducer 4 is connected to the motor housing and the rear housing. The hybrid power assembly further includes a starting motor mounted on the engine for starting the engine.

The starting motor, the transmission 2, the motor 3, the speed reducer 4 and the motor bracket 5 are assembled directly or indirectly. There are some manufacturing tolerances of above each member during manufacturing thereof, furthermore there are some assembling tolerances among the members after assembling. Therefore, the integration extent of the hybrid power assembly is poor. In addition, the cooperation among the members may cause shortened life and vibrating noise, which may influence the NVH performance. In other words, Noise, Vibration, and Harshness of the vehicle, which are called the NVH performance of a vehicle, are as a primary factor for measuring the quality of design and manufacturing.

SUMMARY

An integrated hybrid power assembly and a vehicle including the same are provided, so as to solve at least one of the problems existing in the related art to at least some extent.

According to embodiments of a first aspect of the present disclosure, an integrated hybrid power assembly is provided. The integrated hybrid power assembly includes: a transmission including a front housing and a rear housing; a drive motor including a motor housing integrated with the rear housing and a motor cover mounted to the motor housing; a speed reducer including a reducer housing which is connected to the rear housing and integrated with the motor cover, and a reducer cover mounted to the reducer housing; and a starting motor mounted to the transmission.

According to embodiments of a second aspect of the present disclosure, a vehicle is provided. The vehicle includes the integrated hybrid power assembly according to the first aspect of the present disclosure.

With the integrated hybrid power assembly and the vehicle according to the embodiments of the present disclosure, by integrating the rear housing 110 and the motor housing 210, as well as integrating the motor cover 220 and the reducer housing 210, then connecting the motor cover 220 to the motor housing 210, as well as connecting the reducer housing 210 to the rear housing 110, the assembling of the integrated hybrid power assembly is accomplished. Therefore, the installation relationship among the transmission 100, the drive motor 200 and the speed reducer 300 is simplified to some extent, the problem that the NVH performance degrades due to the tolerance occurred in the manufacturing and assembling process is solved, the motor bracket in prior art is omitted. Furthermore, the integration extent of the integrated hybrid power assembly is promoted, because the starting motor 400 is fixed on the transmission 100.

DETAILED DESCRIPTION

Figure 1:
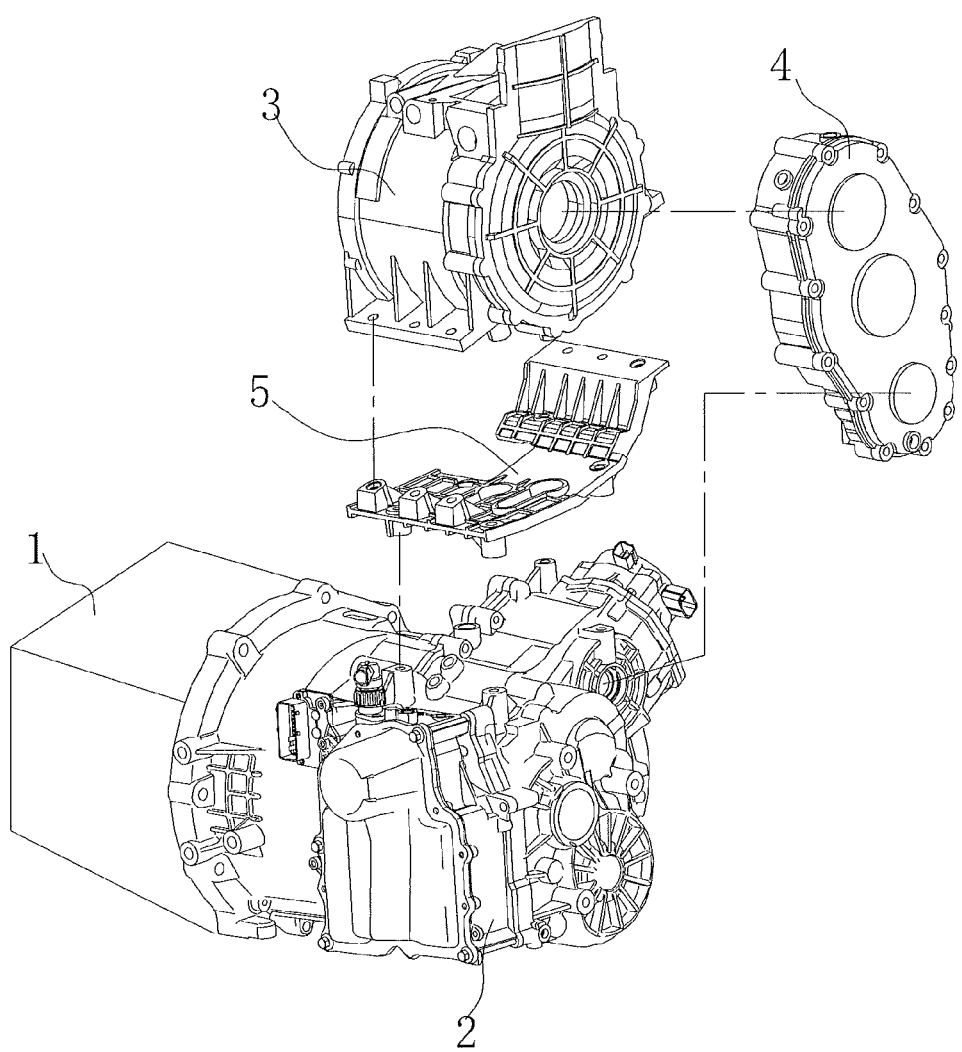
FIG. 1 is an exploded view of an integrated hybrid power assembly in the prior art.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

Terms concerning attachments, coupling and the like, such as "connected" and "interconnected", refer to a relationship in which structures are secured or attached to one another either directly or indirectly through intervening structures, as well as both movable or rigid attachments or relationships, unless expressly described otherwise.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The integrated hybrid power assembly according to embodiments of the present disclosure will be described with reference to FIGS. 2-10.

As shown in FIGS. 2-10, an integrated hybrid power assembly according to embodiments of the present disclosure includes: a transmission 100, a drive motor 200, a speed reducer 300, and a starting motor 400. The transmission 100 includes a front housing 120 and a rear housing 110. The drive motor 200 includes a motor housing 210 integrated with the rear housing 110 and a motor cover 220 mounted to the motor housing 210. The speed reducer 300 includes a reducer housing 310 which is connected to the rear housing 110 and integrated with the motor cover 220, and a reducer cover 320 mounted to the reducer housing 310. The starting motor 400 is mounted to the transmission 100.

By integrating the rear housing 110 to the motor housing 210, integrating the motor cover 220 to the reducer housing 210, then connecting the motor cover 220 to the motor housing 210, as well as connecting the reducer housing 210 to the rear housing 110, the assembling of the integrated hybrid power assembly is achieved. Therefore, the assembling of the transmission 100, the drive motor 200 and the speed reducer 300 is simplified, and the degrading of the NVH performance due to the tolerance occurred in the manufacturing and assembling process is solved, the motor bracket in the prior art is not necessary and can be eliminated. Furthermore, the integration extent of the integrated hybrid power assembly is improved by fixing the starting motor 400 on the transmission 100.

In some embodiments, a parking mechanism mounting portion 510 is disposed on the rear housing 110 and located at a first side (e.g. the right side in FIGS. 2 and 3) of a connecting part between the motor housing 210 and the rear housing 110. The integrated hybrid power assembly further includes a parking mechanism cover 500 mounted on the parking mechanism mounting portion 500, thus the parking mechanism cover 500 is connected to the rear housing 110 and can be used as a reinforcing member of the connecting part between the motor housing 210 and the rear housing 110. Therefore, the connection strength between the motor housing 210 and the rear housing 110 is enhanced, and the integration extent of the integrated hybrid power assembly is further improved. Here, the first side and the second side are separated by a demarcation line defined by the connecting part between the motor housing 210 and the rear housing 110. The second side is opposite to the first side of the connecting part. For example, the first side is the right side in FIGS. 3 and 5, and the second side is the left side in FIGS. 3 and 5.

In some embodiments, the transmission 100 is a dual clutch automatic transmission.

Figure 2:
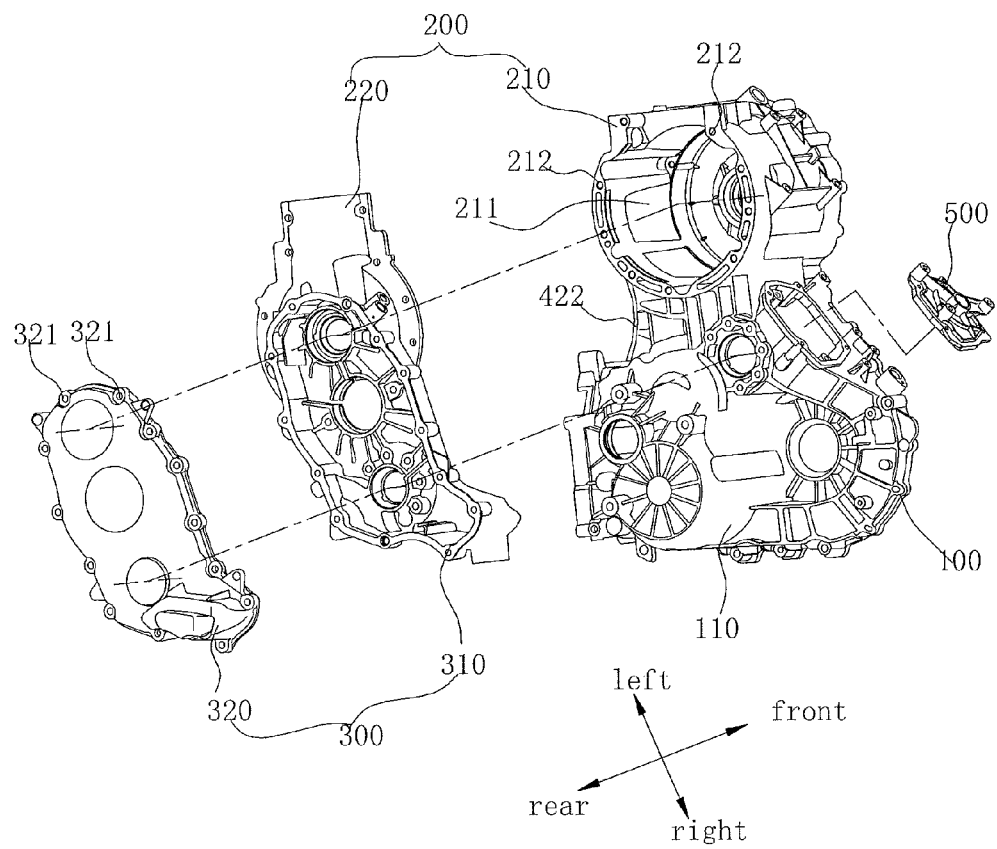
FIG. 2 is an exploded view of an integrated hybrid power assembly according to an embodiment of the present disclosure.
Figure 3:
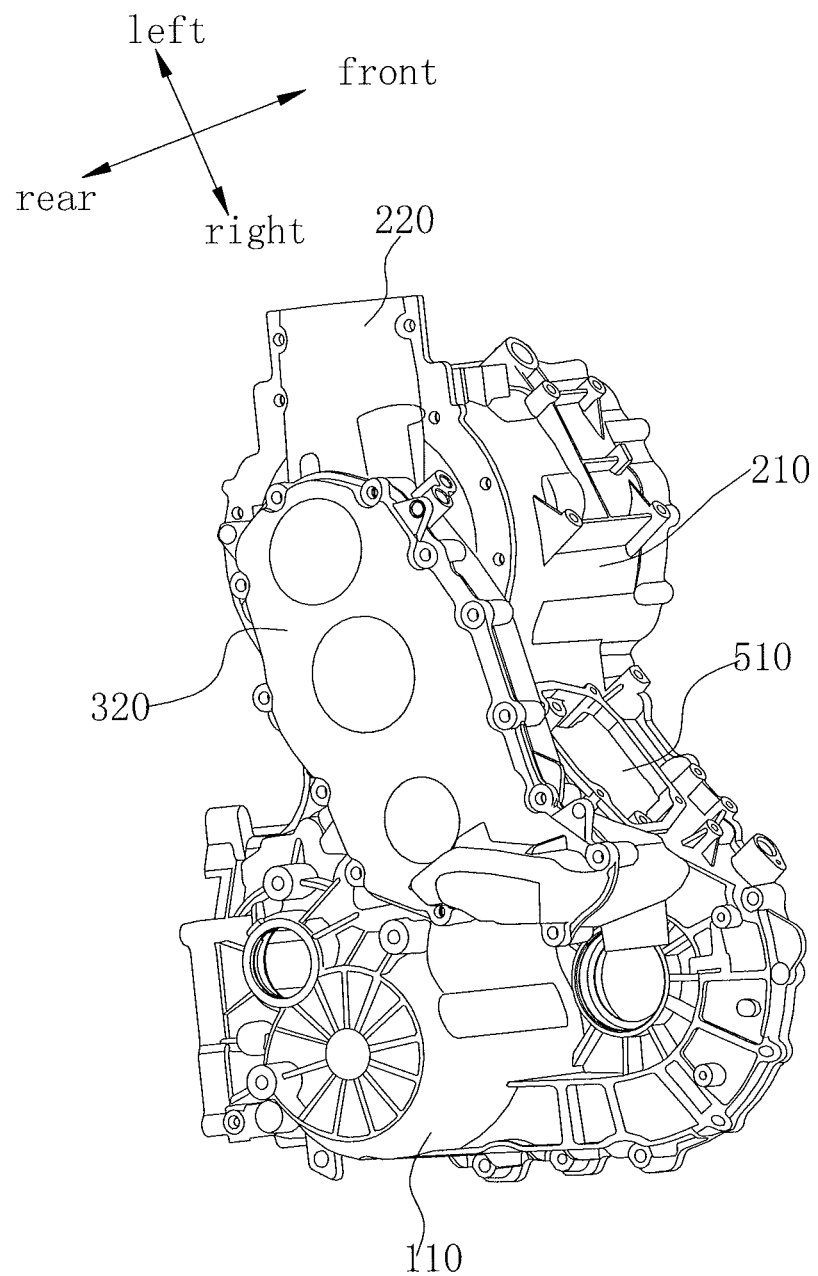
FIG. 3 is a partial schematic view of an integrated hybrid power assembly according to an embodiment of the present disclosure.

In some embodiments, as shown in FIG. 2, the motor housing 210 is fixed on the top of the rear housing 110. Particularly, the motor housing 210 has an opening 211 towards the side at which the speed reducer 300 is located. The motor housing 210 is connected to the motor housing 210 and closes the opening 211.

There are some manners of manufacturing the rear housing 110 and the motor housing 210 integrally. The first manner is that: the rear housing 110 is connected directly and integrally with the motor housing 210, for example, by welding, or the rear housing 110 and the motor housing 210 are manufactured integrally by casting such as aluminum alloy die-casting. Alternatively, when the rear housing 110 and the motor housing 210 are made of cast iron, they may be manufactured integrally via the metal mold sand casting. The second manner is that, the rear housing 110 is connected integrally with the motor housing 210 via at least one reinforcement rib 410, for example, by welding, or the rear housing 110, the motor housing 210 and the reinforcement rib 410 are manufactured integrally by casting such as aluminum alloy die-casting. Alternatively, when the rear housing 110, the motor housing 210 and the reinforcement rib 410 are made of cast iron, they may be manufactured integrally via the metal mold sand casting.

Figure 5:
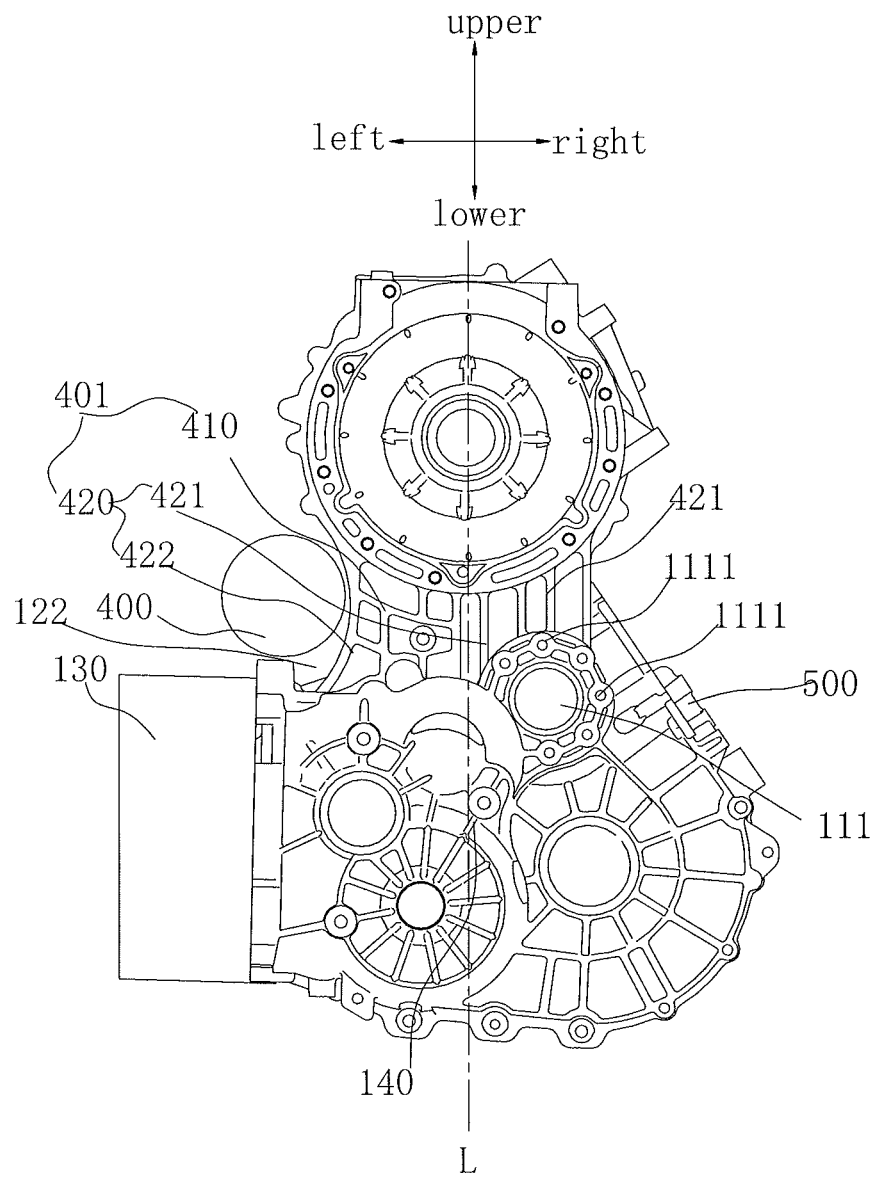
FIG. 5 is a rear view of a motor housing and a transmission of an integrated hybrid power assembly according to an embodiment of the present disclosure.

In some embodiments, as shown in FIGS. 2 and 5, a top end of the rear housing 110 is connected integrally via reinforcement ribs 410 with the bottom end of the motor housing 210, so as to save material, reduce weight and cost, and facilitate dissipation of heat and arrangement of the whole structures (e.g., the arrangement of locating holes and mounting holes, etc.). The reinforcement rib 401 includes at least one of lateral a reinforcement rib 410 and a longitudinal reinforcement rib 420. As shown in FIG. 5, the lateral direction (i.e. the left and right direction in FIG. 5) is a direction substantially perpendicular to a connecting line between the transmission 100 and the motor housing 200 and the longitudinal direction (i.e. the up and down direction in FIG. 5) is a direction substantially parallel to the connecting line. It will be appreciated by those skilled in the art that "perpendicular" and "parallel" do not mean "absolutely perpendicular" and "absolutely parallel", but means "substantially perpendicular" and "substantially parallel", respectively.

In an implementation of the present disclosure, the reinforcement ribs may be an arc or a curve in shape. In some embodiments, a plurality of the longitudinal reinforcement ribs 420 are provided, and distances between adjacent longitudinal reinforcement ribs 420 become larger, along a direction away from a vertical line L passing through a center of gravity of the drive motor 200 and perpendicular to a horizontal plane, i.e., the direction from central to right or left horizontally in FIG. 5. Therefore, the design of the reinforcement ribs is more reasonable, and the longitudinal reinforcement ribs 420 can support the drive motor 200 better. Alternatively, the longitudinal reinforcement rib 420 includes at least one of a straight reinforcement rib 421 and an arc reinforcement rib 422. In some embodiments, each of the straight reinforcement rib 421 is parallel to the vertical line perpendicular to the horizontal plane, so that the straight reinforcement rib 421 can support the drive motor 200 better.

In some embodiments, as shown in FIG. 5, the longitudinal reinforcement rib 420 includes straight reinforcement ribs 421 and arc reinforcement ribs 422, and the longitudinal reinforcement rib farthest from the vertical line is configured as the arc reinforcement rib 422. Because the vibration frequencies of the rear housing 110 and the drive motor 200 may be different, the arc reinforcement rib 422 has buffer function, and can reduce the noise and the vibration. In some embodiments, the longitudinal reinforcement rib located at the first side (the right side in FIG. 5) of the connecting part between the motor housing 210 and the rear housing 110 is the straight reinforcement ribs 421, and the longitudinal reinforcement rib located at the second side (the left side in FIG. 5) is the arc reinforcement ribs 422. The arc reinforcement rib 422 is configured to be protruded towards the vertical line and forms a starting motor receiving portion 122. In addition, the shape of the arc reinforcement rib 422 is adapted to a contour profile of the starting motor 400, thus the starting motor 400 can be integrated with rear housing 110 at best. The shape of the arc reinforcement rib 422 is designed based on the reserved space in the integrated hybrid power assembly. Advantageously, the connection surface between two ends of the arc reinforcement ribs 422 respectively connected to the motor housing 210 and the rear housing 110 is a chamfered surface, thus buffering and supporting better.

Figure 4:
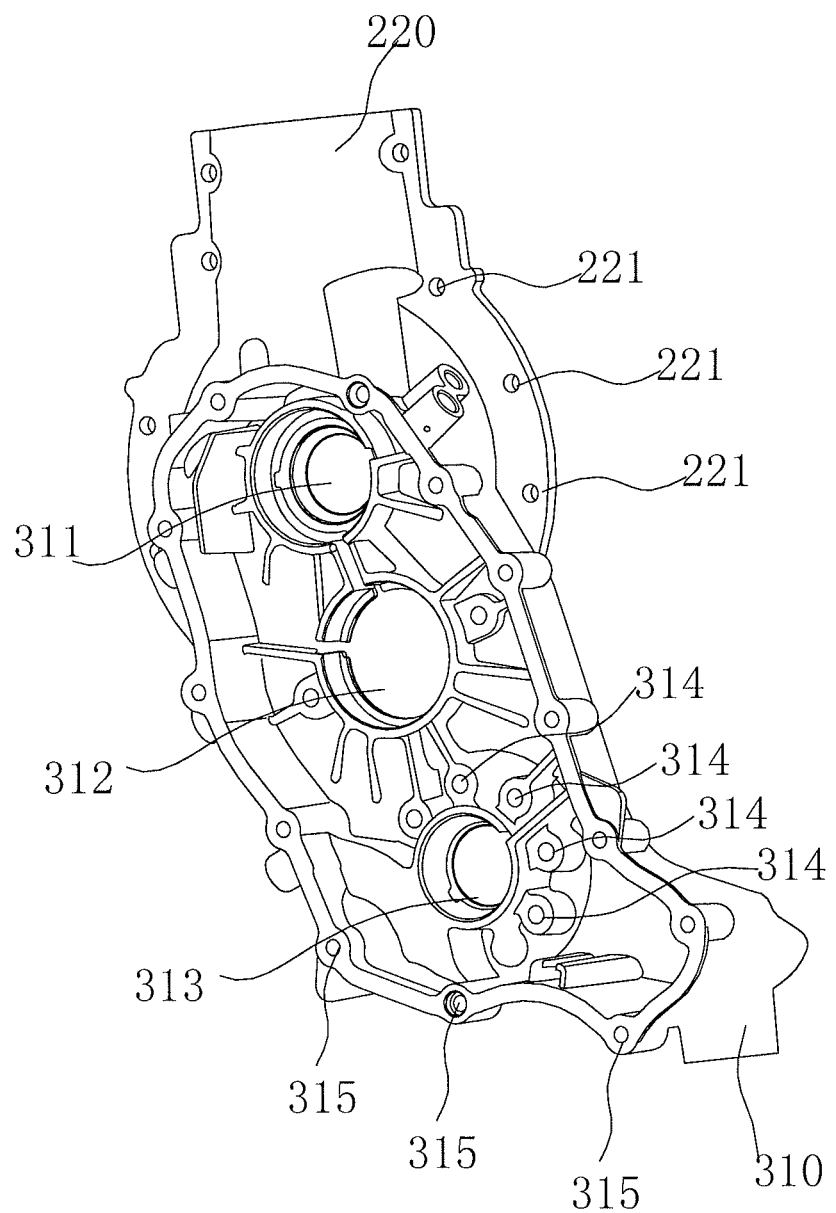
FIG. 4 is a schematic view of a motor cover and a reducer housing of an integrated hybrid power assembly according to an embodiment of the present disclosure.

In some embodiments, as shown in FIGS. 2 and 4, the motor cover 220 may be integrated with the reducer 310 by casting such as aluminum alloy die-casting. Alternatively, the metal mold sand casting may be used when the motor cover 220 and the reducer 310 are made of cast iron. More specifically, the back surfaces of the motor cover 220 and the reducer housing 310 face opposite directions. Herein "the back surface of the motor cover 220" refers to the surface away from the interior of the drive motor 200, "the back surface of the reducer housing 310" refers to the surface away from the interior of the speeder reducer 300. In some embodiments, the motor cover 220 is fixed on the top of the reducer housing 310. In this case, the motor cover 220 and the reducer housing 310 are integrated with each other, and connected to the motor housing 210 and the rear housing 110 respectively, so that the connection between the drive motor 220 and the transmission 100 is strengthened.

In some embodiments, the motor cover 220 is connected to the motor housing 210 via bolts, and the reducer housing 310 is connected to the rear housing 110 via bolts, so that the reducer housing 310 can be disassembled easily during maintaining. A first motor threaded hole is formed in the motor cover 220, a second motor threaded hole is formed in the motor housing 210, and the motor housing 210 and the motor cover 220 are connected to each other by a first screw member engaging the first motor threaded hole and the second motor threaded hole. Alternatively, the first motor threaded holes are formed in the overlapping area of the motor cover 220 and the reducer housing 310. For example, as shown in FIGS. 2-5, the motor cover 220 can be connected more steadily via the first motor threaded holes in the overlapping area. Alternatively, the first motor threaded holes may be arranged equally and circumferentially at the edge of the motor cover 220, here the term "arranged equally" refers to "arranged along the circumference of the motor cover 220, with the output shaft of the drive motor as the axis".

As shown in FIG. 4, a first gear shaft hole 311, a second gear shaft hole 312 and a third gear shaft hole 313, are arranged in a proper sequence in the reducer housing 310. A plurality of first transmission threaded holes 314 are formed in the reducer housing 310 around the third gear shaft hole 313. A reversing shaft hole 111 and a plurality of second transmission threaded holes 1111 around the reversing shaft hole 111 are formed in the rear housing 110. The position of the third gear shaft hole 313 is corresponding to that of the reversing shaft hole 111. The reducer housing 310 and the rear housing 110 are connected to each other by a second screw member engaging the first transmission threaded holes 314 and the second transmission threaded holes 1111.

The reducer cover 320 is connected hermetically to the reducer housing 310. A first reducer threaded hole 321 is formed in the reducer cover 320, a second reducer threaded hole 315 is formed in the reducer housing 310, the reducer housing 310 and the reducer cover 320 are connected to each other by a third screw member engaging the first reducer threaded holes 321 and the second reducer threaded holes 315. Therefore, the reducer cover 320 can be disassembled easily when maintained, and the stability of the speed reducer 300 fixed on the rear housing 110 is enhanced.

Figure 6:
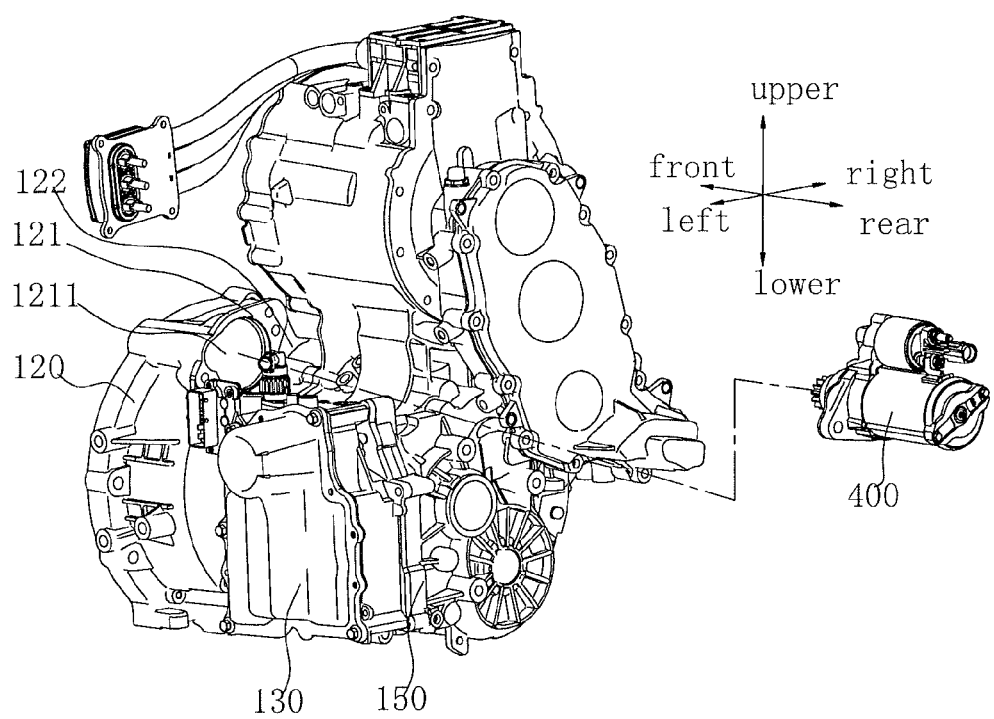
FIG. 6 is a partial schematic view of an integrated hybrid power assembly according to an embodiment of the present disclosure, showing a starting motor mounting portion.
Figure 7:
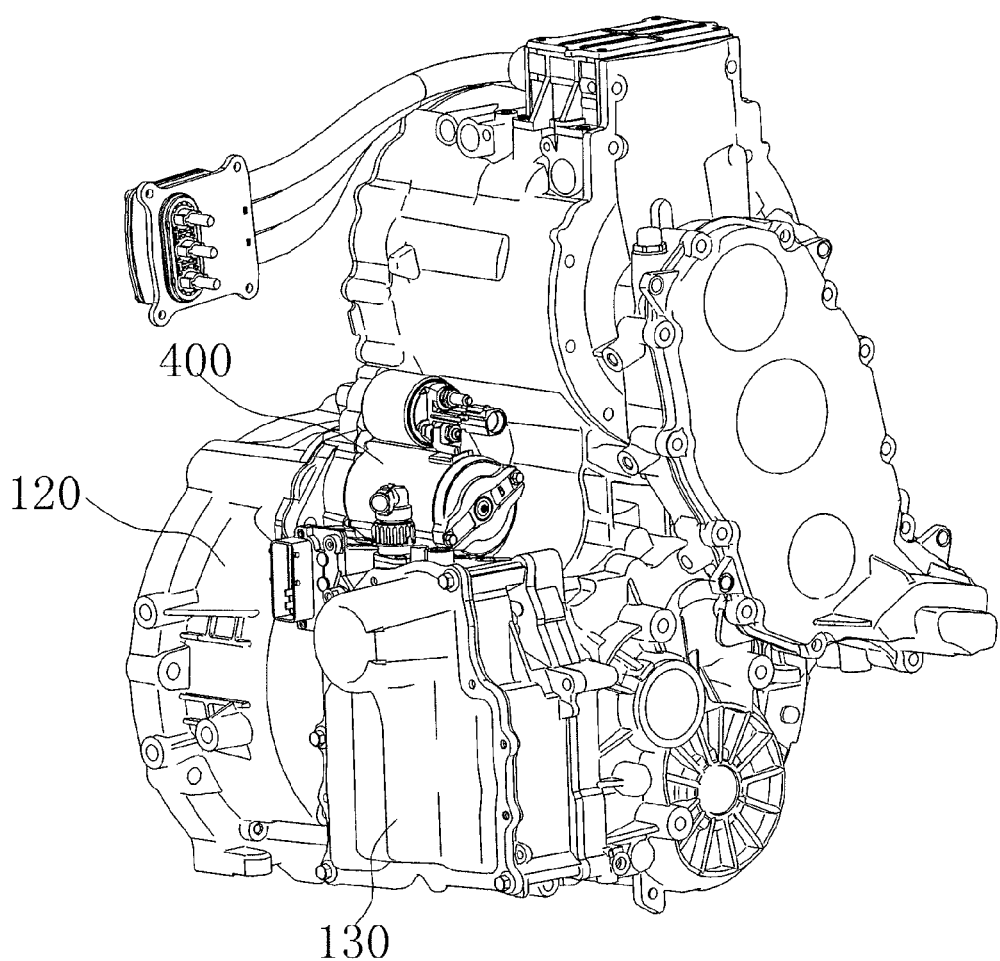
FIG. 7 is a schematic view of an integrated hybrid power assembly according to an embodiment of the present disclosure.
Figure 8:
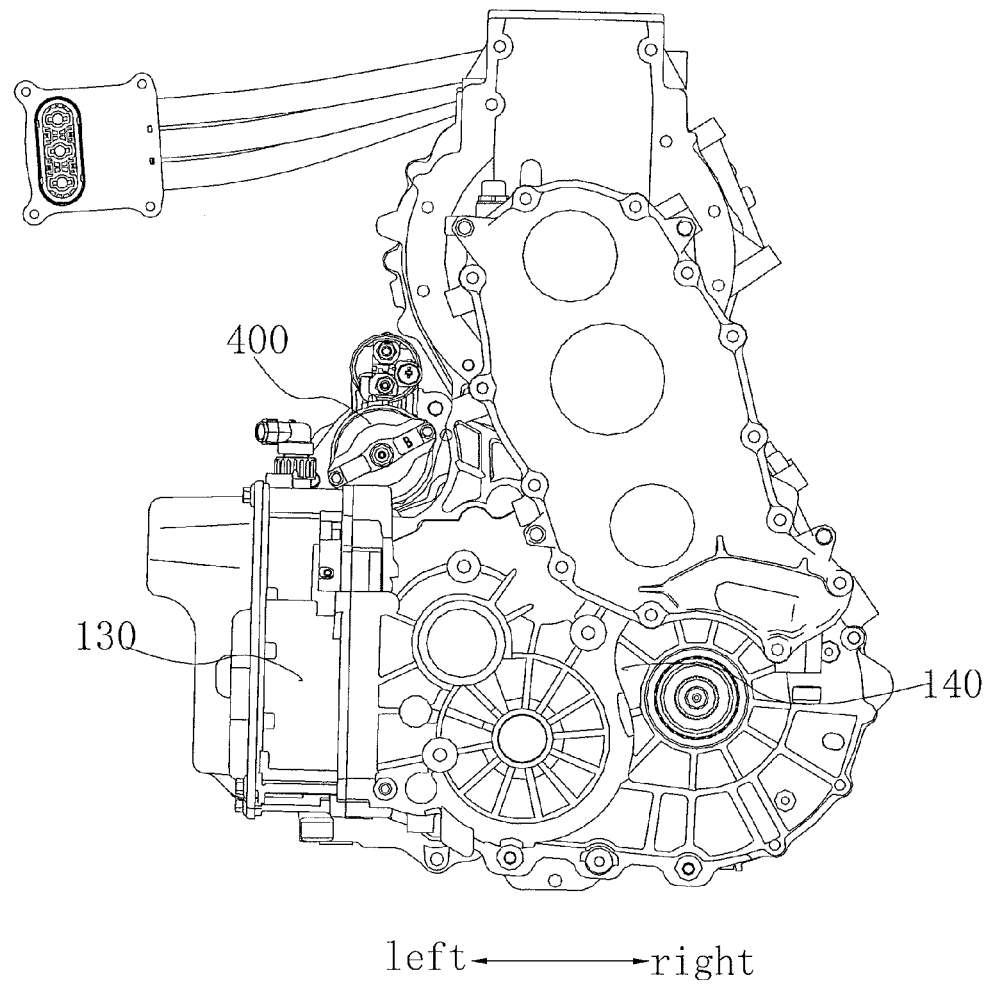
FIG. 8 is a rear view of an integrated hybrid power assembly according to an embodiment of the present disclosure.
Figure 9:
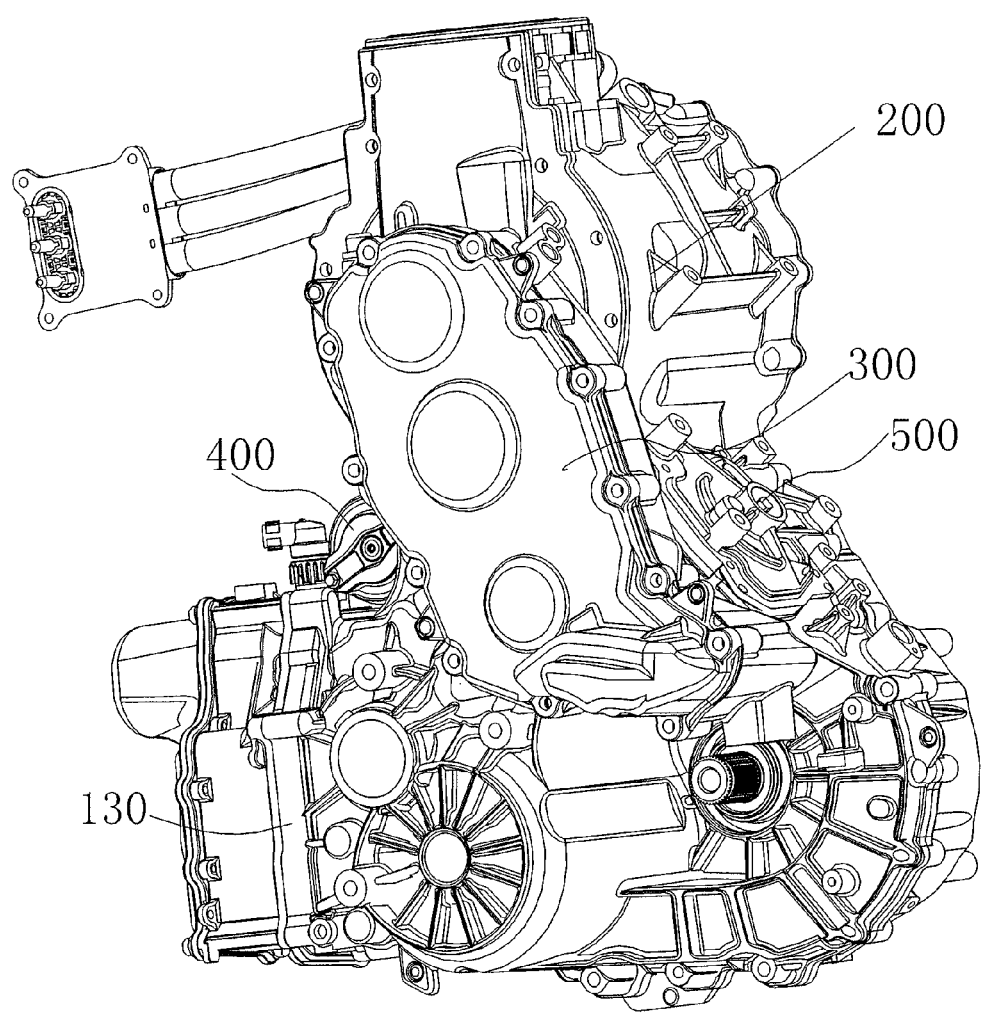
FIG. 9 is a schematic perspective view of an integrated hybrid power assembly according to an embodiment of the present disclosure.

In some embodiments, the starting motor 400 for starting an engine of a vehicle is connected to the front hosing 120 of the transmission 100. The starting motor 400 is located on the second side (i.e. the left side in FIGS. 5 and 8) of the connecting part between the motor housing 210 and the rear housing 110. Alternatively, a starting motor mounting portion 121 is disposed on the front housing 120, and the starting motor 400 is mounted on the starting motor mounting portion 121. The starting motor receiving portion 122 is provided at the second side of the connecting part between the motor housing 210 and the rear housing 110, and the starting motor 400 is received in the starting motor receiving portion. In some embodiments, the arc reinforcement rib 422 is protruded towards the vertical line, and thus the starting motor receiving portion 122 is formed by the depressed portion defined by the arc reinforcement rib 422. As shown in FIG. 6, the starting motor mounting portion 121 is disposed between the starting motor receiving portion 122 and the front housing 120. A gear connected to the starting motor 400 is connected to the engine (not shown) through an aperture 1211 which is formed on the starting motor mounting portion 121.

As shown in FIGS. 5-8, the transmission 100 further includes a transmission controlling module 130 and a gear train 140. The transmission controlling module 130 is disposed on the rear housing 110 for controlling the operating of the transmission 100. In some embodiments, the rear housing 110 is provided with a mounting part 150 for mounting transmission controlling module, which is located at the second side (i.e., the right side in FIG. 5) of the connecting part between the motor housing 110 and the rear housing 110. In other words, the mounting part 150 of transmission controlling module and the starting motor 400 are located at the same side of the rear housing 110, and the mounting part of transmission controlling module is beneath the starting motor 400. The gear train 140 of transmission is located at the right side of the transmission controlling module 130.

Figure 10:
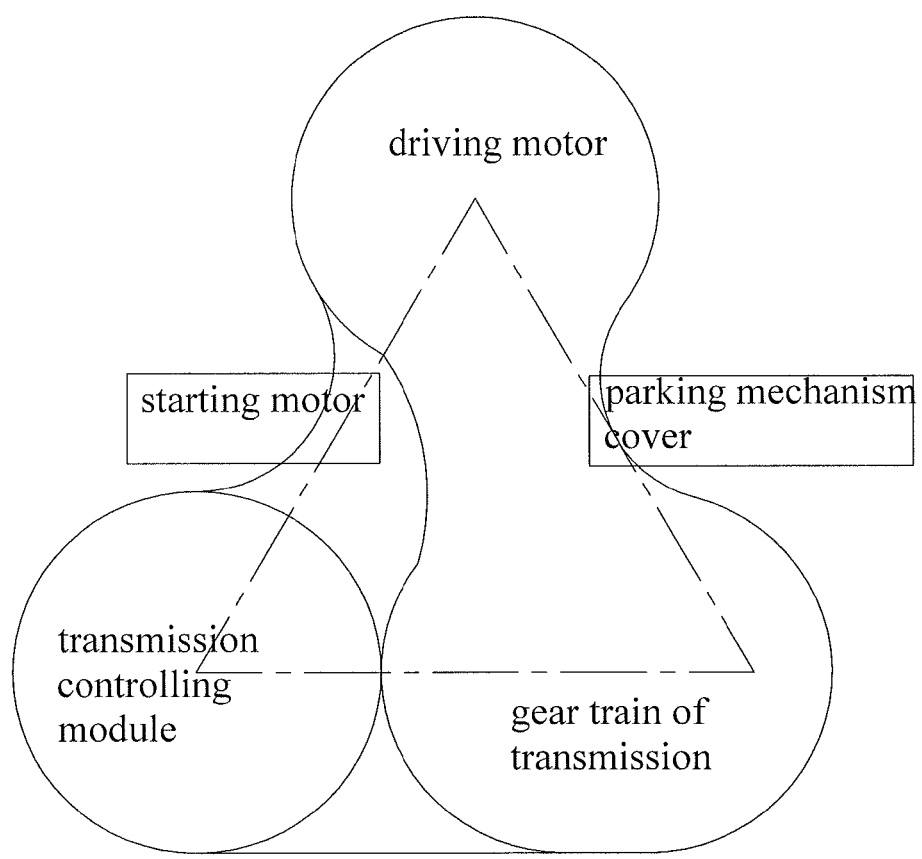
FIG. 10 is a schematic view of a frame of an integrated hybrid power assembly according to an embodiment of the present disclosure.

As shown in FIG. 10, when viewing along a direction from the rear housing 110 to the front housing 120, the whole structure of the integrated hybrid power assembly has a triangle shape. Particularly, the drive motor is located at the top, the transmission controlling module 130 is located at the bottom left corner, while the gear train 140 of transmission is located at the bottom right corner. The starting motor 400 is arranged substantially between the drive motor 200 and the transmission controlling module 130, and the parking mechanism cover 500 is arranged substantially between the drive motor 200 and the gear train 140 of transmission. Therefore, the stability of the whole structure is ensured because of such triangle structure.

The operation of the integrated hybrid power assembly according to embodiments of the invention will be described below.

The drive motor 200 has an output shaft. A first gear (not shown) is fixed to the first gear shaft hole 311, a second gear (not shown) is fixed to the second gear shaft hole 312, and a third gear (not shown) is fixed to the third gear shaft hole 313. Then the first gear, the second gear, and the third gear are meshed successively. A reversing shaft (not shown) of the transmission is fixed to the reversing shaft hole 111, which is provided with a reversing shaft gear (not shown). The output shaft of the drive motor 200 is coaxial with the first gear, and the third gear is coaxial with the axis of the reversing shaft of the transmission.

When operating, a torque is transferred from the output shaft of the drive motor 200 to the first gear, to the reversing shaft of the transmission through the second gear and the third gear successively, and then the reversing shaft gear on the reversing shaft is meshed with a differential (not shown) of the vehicle. Finally, the torque is outputted to the vehicle to provide the driving force. For stability of the structure of the integrated hybrid power assembly, the reversing shaft gear is disposed on the upper right of the gear train 140 of transmission, so as to reduce the distance between the reversing shaft gear and the drive motor 200, and to ensure the life of the components of the gear train 140 of transmission.

According to embodiments of another aspect of the present disclosure, a vehicle is provided. The vehicle includes the integrated hybrid power assembly described with reference to the embodiments of the present disclosure.

With the vehicle of the embodiments of the present disclosure, by integrating the rear housing 110 and the motor housing 210, as well as integrating the motor cover 220 and the reducer housing 210, then connecting the motor cover 220 to the motor housing 210, as well as connecting the reducer housing 210 to the rear housing 110, the assembling of the integrated hybrid power assembly is achieved. Therefore, the assembling of the transmission 100, the drive motor 200 and the speed reducer 300 is simplified, the degrading of the NVH performance due to the tolerance occurred in the manufacturing and assembling process is solved, the motor bracket in prior art is eliminated. Furthermore, the integration extent of the integrated hybrid power assembly is improved, because the starting motor 400 is fixed on the transmission 100.

Reference throughout this specification to "an embodiment," "some embodiments," "an example," or "some examples," means that a particular feature, structure, material, or characteristic described in connection with the embodiment or example is included in at least one embodiment or example of the present disclosure. Thus, the appearances of the phrases such as "an embodiment," "some embodiments," "an example," or "some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An integrated hybrid power assembly, comprising:
   a transmission comprising a front housing and a rear housing;
   a drive motor comprising a motor housing integrated with the rear housing of the transmission and a motor cover mounted to the motor housing;
   a speed reducer comprising a reducer housing, which is fixedly connected to the rear housing of the transmission and integrated with the motor cover of the drive motor, and a speed reducer cover mounted to the reducer housing; and
   a starting motor mounted to the transmission,
   wherein a parking mechanism mounting portion is disposed on the rear housing and located on a first side of a connecting part between the motor housing of the drive motor and the rear housing of the transmission, and
   the starting motor is located on a second side, opposite to the first side, of the connecting part between the motor housing of the drive motor and the rear housing of the transmission and the transmission is configured as a dual clutch automatic transmission.

2. The integrated hybrid power assembly according to claim 1, further comprising a parking mechanism cover mounted on the parking mechanism mounting portion.

3. The integrated hybrid power assembly according to claim 1, wherein the rear housing of the transmission is integrated with the motor housing into one body via at least one reinforcement rib.

4. The integrated hybrid power assembly according to claim 3, wherein the reinforcement rib comprises at least one of a lateral reinforcement rib and a longitudinal reinforcement rib.

5. The integrated hybrid power assembly according to claim 4, wherein a plurality of the longitudinal reinforcement ribs are provided in a horizontal plane along two opposite directions away from a vertical line passing through a center of gravity of the drive motor and perpendicular to the horizontal plane with distances between adjacent longitudinal reinforcement ribs increasing when they are further away from the vertical line.

6. The integrated hybrid power assembly according to claim 5, wherein the longitudinal reinforcement rib comprises at least one of a straight reinforcement rib and an arc reinforcement rib.

7. The integrated hybrid power assembly according to claim 6, wherein the straight reinforcement rib is parallel to the vertical line.

8. The integrated hybrid power assembly according to claim 7, wherein the longitudinal reinforcement rib further comprises straight reinforcement ribs and arc reinforcement ribs located farthest from the vertical line.

9. The integrated hybrid power assembly according to claim 1, wherein the rear housing is formed integrally with the motor housing via casting.

10. The integrated hybrid power assembly according to claim 1, wherein back surfaces of the motor cover of the drive motor and the reducer housing of the speed reducer face opposite directions.

11. The integrated hybrid power assembly according to claim 1, wherein the motor cover of the drive motor is connected to the motor housing via bolts, and the reducer housing of the speed reducer is connected to the rear housing via bolts.

12. The integrated hybrid power assembly according to claim 11, wherein a first motor threaded hole is formed in the motor cover of the drive motor, a second motor threaded hole is formed in the motor housing of the drive motor, the motor housing and the motor cover are connected to each other by a first screw member engaging the first motor threaded hole and the second motor threaded hole.

13. The integrated hybrid power assembly according to claim 1, wherein a first reducer threaded hole is formed in the reducer cover, a second reducer threaded hole is formed in the reducer housing, the reducer housing and the reducer cover are connected to each other by a third screw member engaging the first reducer threaded hole and the second reducer threaded hole.

14. The integrated hybrid power assembly according to claim 1, wherein the starting motor is connected to the front housing of the transmission.

15. The integrated hybrid power assembly according to claim 1, wherein the transmission further comprises a transmission controlling module mounted on the rear housing.

16. The integrated hybrid power assembly according to claim 15, wherein a mounting part, on which the transmission controlling module is mounted, is disposed on the rear housing, and the mounting part and the starting motor are located at the same side of the rear housing.

17. A vehicle, comprising the integrated hybrid power assembly according to claim 1.

* * * * *